United States Patent
Ambrosin et al.

(10) Patent No.: US 12,081,680 B2
(45) Date of Patent: *Sep. 3, 2024

(54) AUTOMATICALLY VERIFYING VEHICLE IDENTITY AND VALIDATING VEHICLE PRESENCE

(71) Applicant: Intel Corporation, Santa Clara, CA (US)

(72) Inventors: Moreno Ambrosin, Hillsboro, OR (US); Kathiravetpillai Sivanesan, Portland, OR (US); Rafael Misoczki, Hillsboro, OR (US); Sridhar Sharma, Palo Alto, CA (US); Ignacio Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,830

(22) Filed: Oct. 4, 2021

(65) Prior Publication Data

US 2022/0141042 A1 May 5, 2022

Related U.S. Application Data

(63) Continuation of application No. 16/236,397, filed on Dec. 29, 2018, now Pat. No. 11,139,990.

(51) Int. Cl.
*H04L 9/32* (2006.01)
*H04L 9/06* (2006.01)
*H04L 9/08* (2006.01)

(52) U.S. Cl.
CPC .......... *H04L 9/3273* (2013.01); *H04L 9/0643* (2013.01); *H04L 9/0866* (2013.01);
(Continued)

(58) Field of Classification Search
CPC ... H04L 9/3273; H04L 9/0869; H04L 9/0872; H04L 9/0891; H04L 9/3213;
(Continued)

(56) References Cited

U.S. PATENT DOCUMENTS

| 7,574,599 | B1 * | 8/2009 | Zhang ................... H04L 9/3273 713/168 |
| 11,139,990 | B2 | 10/2021 | Ambrosin et al. |

(Continued)

FOREIGN PATENT DOCUMENTS

| EP | 2073430 A1 * | 6/2009 | ........... H04L 9/0844 |
| EP | 3258663 A1 | 12/2017 | |

(Continued)

OTHER PUBLICATIONS

3GPP; TSG SA; Study on security aspects for LTE support of Vehicle-to-Everything (V2x) services (Release 14), 3GPP TR 33.885 V14.1.0, Sep. 21, 2017 (Year: 2017).*

(Continued)

*Primary Examiner* — Jeffrey C Pwu
*Assistant Examiner* — Mayasa A. Shaawat
(74) *Attorney, Agent, or Firm* — Schwegman Lundberg & Woessner, P.A.

(57) ABSTRACT

Systems, apparatuses and methods may provide for infrastructure node technology that conducts a mutual authentication with a vehicle and verifies, if the mutual authentication is successful, location information received from the vehicle. The infrastructure node technology may also send a token to the vehicle if the location information is verified, wherein the token includes an attestation that the vehicle was present in a location associated with the location information at a specified moment in time. Additionally, vehicle technology may conduct a mutual authentication with an infrastructure node and send, if the mutual authen-
(Continued)

tication is successful, location information to the infrastructure node. The vehicle technology may also receive a token from the infrastructure node.

24 Claims, 7 Drawing Sheets

(52) U.S. Cl.
CPC .......... *H04L 9/0869* (2013.01); *H04L 9/0872* (2013.01); *H04L 9/0891* (2013.01); *H04L 9/0894* (2013.01); *H04L 9/3213* (2013.01); *H04L 9/3242* (2013.01); *H04L 9/3247* (2013.01); *H04L 9/3297* (2013.01); *H04L 2209/84* (2013.01)

(58) Field of Classification Search
CPC ... H04L 9/3242; H04L 9/3247; H04L 9/3297; H04L 2209/84; H04L 67/12
See application file for complete search history.

(56) References Cited

U.S. PATENT DOCUMENTS

| | | | |
|---|---|---|---|
| 2008/0232595 | A1 | 9/2008 | Pietrowicz et al. |
| 2009/0235071 | A1* | 9/2009 | Bellur .................. H04W 12/082 713/158 |
| 2016/0189310 | A1* | 6/2016 | O'Kane .................. G06Q 40/08 705/4 |
| 2016/0323741 | A1 | 11/2016 | Lee et al. |
| 2017/0344023 | A1 | 11/2017 | Laubinger et al. |
| 2019/0140850 | A1 | 5/2019 | Ambrosin et al. |
| 2020/0184078 | A1* | 6/2020 | Hinrichs ............... H04L 9/3268 |

FOREIGN PATENT DOCUMENTS

| | | | |
|---|---|---|---|
| EP | 3903447 | | 11/2021 |
| KR | 101612836 B1 | | 4/2016 |
| WO | WO 2018094554 | * | 5/2018 ........... G06Q 10/083 |
| WO | 2020139512 | | 7/2020 |

OTHER PUBLICATIONS

3GPP, "Security aspect for LTE support of Vehicle-to-Everything (V2X) services", 3GPP TS 33.185 V15.0.0, Jul. 1, 2018, 13 pages.
European Search Report for EPO Patent Application No. 19903471. 1, mailed Aug. 3, 2022, 9 pages.
Brecht et al., "A Security Credential Management System for V2X Communications", IEEE Transactions on Intelligent Transportation Systems, vol. 19, No. 12, Dec. 2018, pp. 3850-3871.
Dolev et al., "On the Security of Public Key Protocols", Standford University, Department of Computer Science, May 1981, 23 pages.
Non-Final Office Action for U.S. Appl. No. 16/236,397, mailed Dec. 7, 2020, 26 pages.
Notice of Allowance for U.S. Appl. No. 16/236,397, mailed May 27, 2021, 9 pages.
International Search Report and Written Opinion for International Patent Application No. PCT/US2019/063693, mailed Mar. 19, 2020, 11 pages.
3GPP, "Study on Security Aspects for LTE Support of Vehicle-to-Everything (V2X) Services", 3GPP TR 33.885 V14.1.0, Sep. 21, 2017, 75 pages.
"U.S. Appl. No. 16/236,397, Response filed Mar. 8, 2021 to Non Final Office Action mailed Dec. 7, 2020", 12 pgs.
"U.S. Appl. No. 16/236,397, 312 Amendment filed Jun. 9, 2021", 8 pgs.
"U.S. Appl. No. 16/236,397, 312 Amendment filed Jul. 13, 2021", 9 pgs.
"U.S. Appl. No. 16/236,397, PTO Response to Rule 312 Communication mailed Jul. 16, 2021", 2 pgs.
"U.S. Appl. No. 16/236,397, Examiner Interview Summary mailed Jul. 19, 2021", 2 pgs.
"International Application Serial No. PCT US2019 063693, International Preliminary Report on Patentability mailed Jul. 8, 2021", 7 pgs.
"U.S. Appl. No. 16/236,397, PTO Response to Rule 312 Communication mailed Sep. 3, 2021", 2 pgs.
"U.S. Appl. No. 16/236,397, Examiner Interview Summary mailed Mar. 9, 2021", 2 pgs.
"European Application Serial No. 19903471.1, Response filed Feb. 21, 2023 to Extended European Search Report mailed Aug. 3, 2022", 32 pgs.
"ETSI TS 133 185 V15.0.0", LTE;5G;Security aspect for LTE support of Vehicle-to-Everything (V2X) services(3GPP TS 33.185 version 15.0.0 Release 15), (Jul. 2018), 13 pgs.

* cited by examiner

AUTOMATICALLY VERIFYING VEHICLE IDENTITY AND VALIDATING VEHICLE PRESENCE

CROSS-REFERENCE TO RELATED APPLICATION

This continuation application claims the benefit of U.S. Non-Provisional patent application Ser. No. 16/236,397 filed Dec. 29, 2018.

TECHNICAL FIELD

Embodiments generally relate to monitoring vehicles. More particularly, embodiments relate to automatically verifying vehicle identity and validating vehicle presence.

BACKGROUND

Vehicle monitoring may be useful in a wide variety of settings such as crash investigations, autonomous fleet management, and so forth. For example, establishing who was present at a crash scene and from what vantage point can be important to an investigation. While environmental cameras (e.g., roadside cameras) may provide useful information regarding vehicle crash sites, coverage areas may be limited. Vehicle sensor data may be useful in certain circumstances, but there remains considerable room for improvement. For example, relying on vehicle sensor data to reconstruct crash scenes may lead to vulnerability concerns with respect to malicious actors who attempt to manipulate the scene reconstruction with false data.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
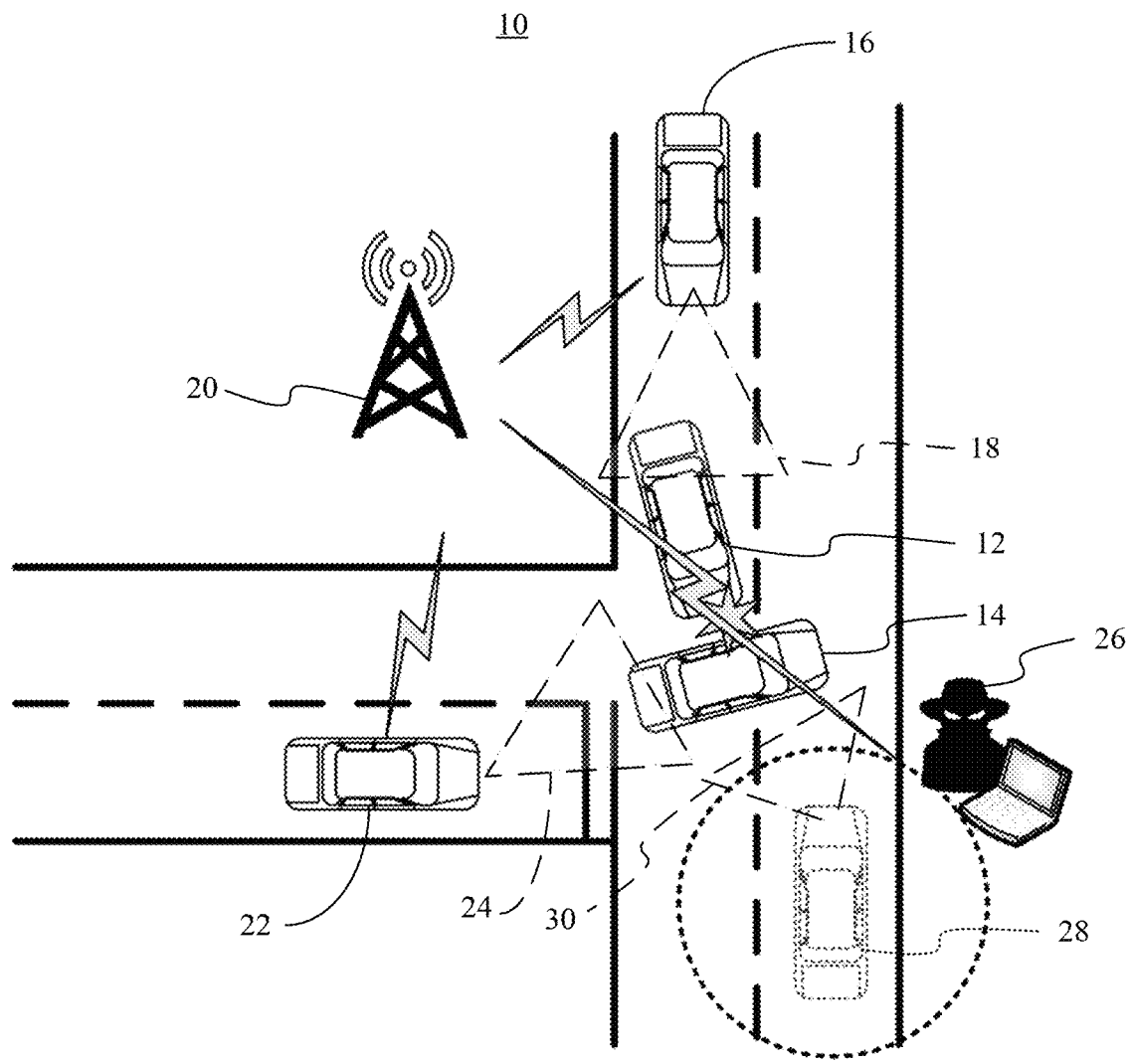
FIG. 1 is a plan view of an example of a data collection from a crash scene that is attacked by a malicious actor according to an embodiment.

Turning now to FIG. 1, a crash scene 10 is shown in which a first vehicle 12 collides with a second vehicle 14 at an intersection. In the illustrated example, a third vehicle 16 is present during the collision and has a vision range 18 (e.g., field of view/FOV) that enables one or more sensors (e.g., cameras, light detection and ranging/lidar sensors, event data recorders/EDRs, etc.) of the third vehicle 16 to capture the collision from a particular vantage point. In an embodiment, the third vehicle 16 wirelessly reports the sensor data collected from the collision to an infrastructure node (IN) 20 such as, for example, a road side unit (RSU), edge node, base station, trusted/neutral entity, and so forth.

Similarly, a fourth vehicle 22 is present during the collision and has a vision range 24 that enables one or more sensors of the fourth vehicle 22 to capture the collision from another vantage point. The illustrated fourth vehicle 22 wirelessly reports the sensor data collected from the collision to the infrastructure node 20. Thus, the infrastructure node 20 may use the sensor data collected from the third vehicle 16 and the fourth vehicle 22 to reconstruct the crash scene 10 (e.g., to determine who was at fault). The vehicles 12, 14, 16 and 22 may be autonomous, manually operated, etc., or any combination thereof.

In the illustrated example, an attacker 26 sends false sensor data to the infrastructure node 20, wherein the false sensor data indicates that a fifth vehicle 28 (which does not exist) is present during the collision and has a vision range 30 that enables one or more sensors of the fifth vehicle 28 to capture the collision from yet another vantage point. Thus, the false sensor data might be used to bias the scene reconstruction to, for example, mis-assign fault in the collision. As will be discussed in greater detail, the infrastructure node 20 may conduct authentication operations that make it more difficult for the attacker 26 to misrepresent the identity of the fifth vehicle 28. In an embodiment, the infrastructure node 20 also verifies the false sensor data (e.g., location information and/or vantage point information) received from the attacker 26 to make it more difficult for the attacker 26 to misrepresent the vision range 30 of the fifth vehicle 28 and/or the presence of the fifth vehicle 28 at the crash scene 10 during the collision altogether.

In one example, the infrastructure node 20 periodically issues cryptographically secure tokens to the vehicles 12, 14, 16 and 22, wherein the tokens include an attestation that the vehicles 12, 14, 16 and 22 were present at the crash scene 10 during the collision. In such a case, the infrastructure node 20 would withhold the tokens from the fifth vehicle 28, which further prevents the attacker 26 from biasing the scene reconstruction with false sensor data. Analogously, the attacker 26 may attempt to deny physical presence at the crash scene 10 scene by altering the recorded location, speed, heading, etc., information associated with one or more of the vehicles 12, 14, 16 and 22. In one example, the capabilities of the attacker 26 resemble the capabilities of a Dolev-Yao attacker who has access to the communications network and can eavesdrop, spoof, fabricate and block messages. In such a case the identity authentication and location verification technology described herein would prevent the attacker 26 from altering the information associated with the vehicles 12, 14, 16 and 22.

Figure 2:
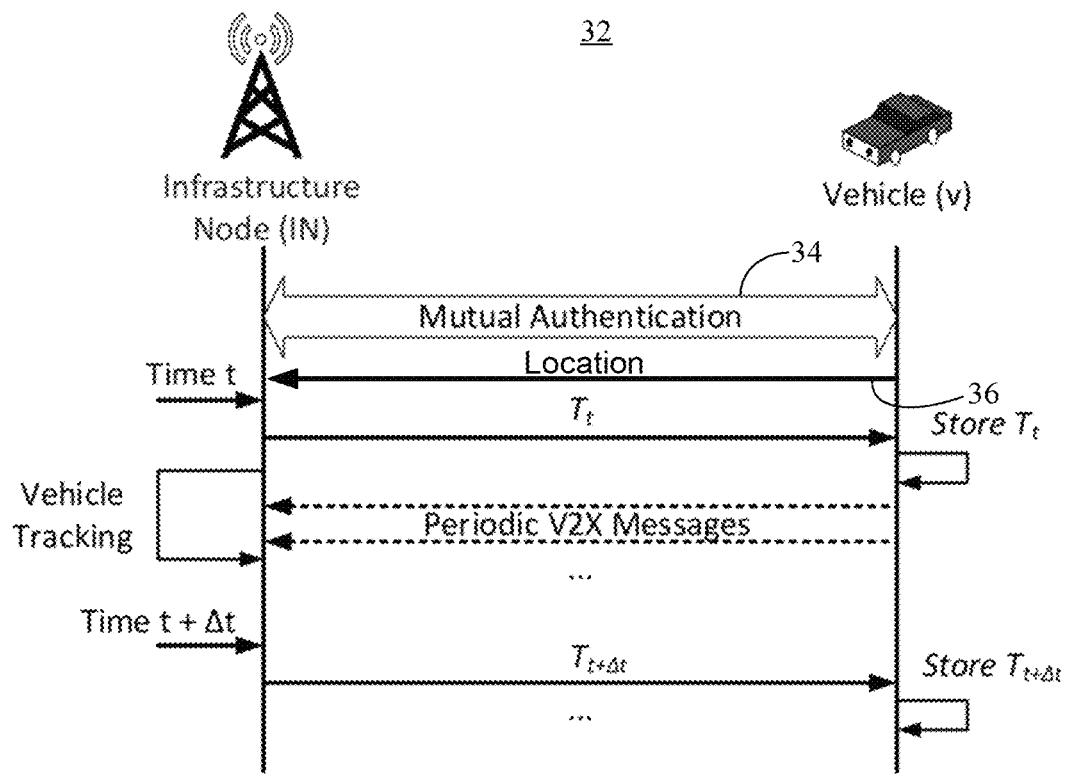
FIG. 2 is a signaling diagram of an example of a communication between an infrastructure node and a vehicle according to an embodiment.

FIG. 2 shows a signaling diagram 32 for communications between an infrastructure node (IN) and a vehicle (v). In one example, the vehicle includes an EDR (event data recorder, e.g., "black box") or other sensors that record critical information about environmental conditions, vehicle conditions, driving decisions/maneuvers, etc. Additionally, the infrastructure node may be part of a network of infrastructure nodes positioned at intersections, in neighborhoods, etc., and connected to a cloud through a cellular core network. In an embodiment, the vehicle communicates with the infrastructure node over a wireless interface. Each entity i, (i.e., the vehicle or IN), possesses a unique identity $id_i$, which can be either a real driver identity or a pseudonym to preserve the privacy of a user, and a public/private key and certificate ($pk_i$, $sk_i$, $cert_i$). When the vehicle enters an area managed by the infrastructure node, the infrastructure node tracks the vehicle sensing using the capabilities (if any) of the infrastructure node, and vehicle to infrastructure (V2X) messages that include the location, heading, speed, etc., of the vehicle.

In general, the infrastructure node and the vehicle first conduct a mutual authentication 34 of one another. In one example, the Public Key Infrastructure (PKI) is used during the mutual authentication. Upon successful authentication, the infrastructure node verifies location information 36 received from the vehicle, wherein the verification may be based on the sensing capabilities (e.g., lidar, camera, etc.) of the infrastructure node. The infrastructure node may also use techniques such as time of flight, Doppler frequency shift, trilateration etc., to validate the location, speed, etc., of the vehicle. The illustrated infrastructure node then generates a token ($T_t$, e.g., via a cryptographically secure process), whose possession by the vehicle serves as a proof of physical presence at a certain location, at a given moment in time t.

Mutual Authentication and Location Verification

As already noted, when the vehicle v enters an area under the control of the infrastructure node, both entities may perform a mutual authentication 34. In an example embodiment, the mutual authentication 34 involves a challenge-response protocol that leverages the credentials possessed by the infrastructure node and v. The infrastructure node can advertise the service proposed herein by periodically broadcasting advertisement "HELLO" messages, signed with a private key associated with the infrastructure node. Once an advertised message is authenticated, v generates a random nonce N, and sends to the infrastructure node a signed and timestamped packet (e.g., via unicast or broadcast) with the id, N, location, speed, heading, etc., of the vehicle. The infrastructure node verifies the authenticity and integrity of the packet (e.g., using the public key and certificate associated with v) and replies with a signed and timestamped message containing N, the identity of the infrastructure node, and a symmetric session key, which is used to protect the confidentiality and integrity of further communications between v and the infrastructure node. After assessing the identity of v, and prior to responding to v, the infrastructure node verifies the location information provided by v (e.g., using V2X signals or other sensor inputs), and compares location and timestamp information.

Token Generation

The token may be constructed as $T_t^v = (t \| id_v \| info \| \sigma_t^v)$, where:

t is the discrete representation of the time (for example, each unit may correspond to a second), $id_v$ is the identity of the vehicle, info is the location and orientation (e.g., vantage point) information provided by v, and matched by the infrastructure node using sensing (e.g., camera, lidar) and tracking capabilities of the infrastructure node. In another embodiment, info is extended with other relevant features of the vehicle's motion, such as speed, acceleration, environmental conditions, driving conditions, social aspects, engine conditions, etc.

$\sigma_t^v$ is the digital signature of $t \| id_v \| info$ using the private key associated with the infrastructure node.

The infrastructure node (with periodicity $\Delta t$, e.g., 1 second) issues a token for v that testifies as to the physical presence of v at a specific location, with a given orientation, and optionally with a given set of other relevant parameters (e.g., speed, acceleration, etc.). The vehicle v stores $T_t^v$, which can be used to prove the location of the vehicle at a given moment in time.

Figure 3:
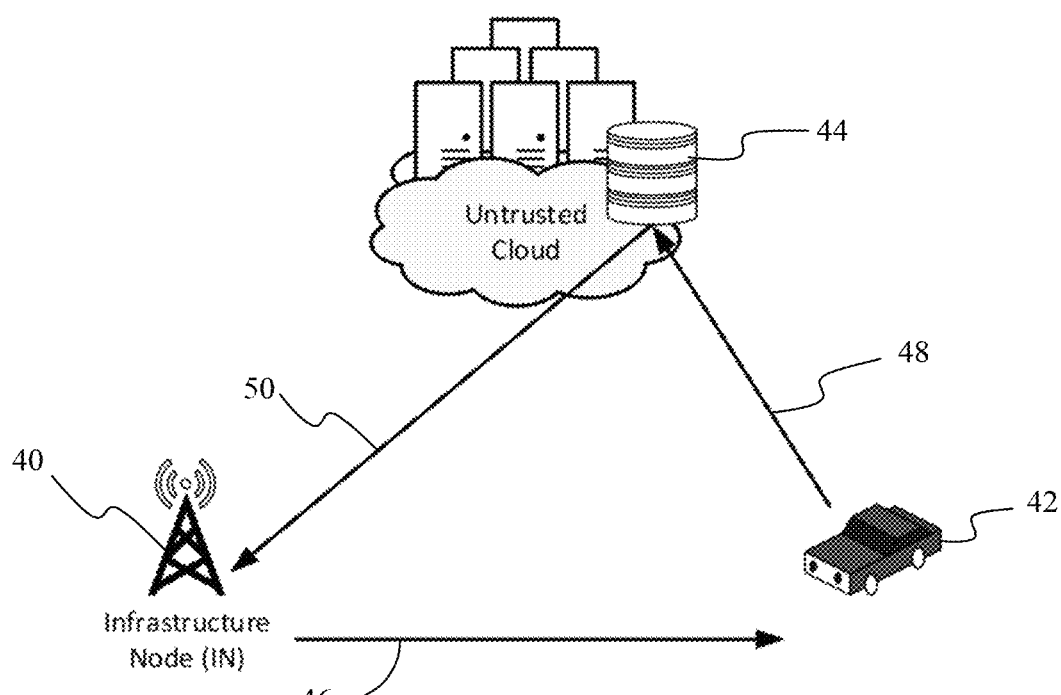
FIG. 3 is an illustration of an example of a communication between a vehicle, an untrusted storage platform and an infrastructure node according to an embodiment.

FIG. 3 shows a set of communications between an infrastructure node 40, a vehicle 42 (v) and a storage platform 44 (e.g., cloud storage, which may be untrusted). In addition to the location token, the vehicle 42 and the infrastructure node 40 establish a secret key to be used by the vehicle 42 to encrypt raw data (e.g., video, audio, the sequence of events, EDR information, etc.) collected during an event. In particular, using the secret key may reduce the storage requirements of the infrastructure node 40. More particularly, the illustrated infrastructure node 40 re-computes the secret key $k_t^v$ only when needed (e.g., in response to a scene reconstruction request). The secret key may also enable the vehicle 42 to upload the encrypted data (which might consist of several gigabytes/GB of video, audio, and any other relevant data) to the storage platform 44. In an embodiment, the storage platform 44 is consulted by the infrastructure node 40 only when needed (e.g., in response to a scene reconstruction request).

In the illustrated example, the infrastructure node 40 sends $k_t^v$ to v alongside $T_t^v$, encrypted with v's public key in a first communication 46. From $k_t^v$, v derives two keys, $k1_t^v$ and $k2_t^v$ using a Key Derivation Function (KDF, e.g., computing a hash of $k_t^v$ concatenated with a 0 or 1 bit). In an embodiment, a first sub-key k1=KDF(k∥1) and a second sub-key k2=KDF(k∥0) are derived, where is the concatenation operator. The illustrated vehicle 42 uses k1 to encrypt the payload (for confidentiality) and uses k2 to compute a Message Authentication Code (MAC, e.g., using a Hash-based MAC for data integrity/authenticity). In an embodiment, vehicle 42 uploads the encrypted data and MAC to the cloud in a second communication 48. The infrastructure node 40 may later fetch the encrypted data associated with a certain time t and vehicle v from the untrusted cloud in a third communication 50. In an embodiment, the infrastructure node 40 reconstructs the key material, and then decrypts and verifies authenticity and integrity of the payload.

The key $k_t^v$ may be derived from a pseudo-random value that is computed from a secret seed S that the infrastructure node 40 stores. In one embodiment, the infrastructure node 40 maintains a pseudo-random sequence of values $S_t$ updated at predefined time intervals of $\Delta t$ (e.g., every second). For this sequence, the infrastructure node 40 might use a pseudo-random generation function "RAND," that takes as input a value $S_t$ and outputs $S_{t+\Delta t}$. The result is a pseudo-random sequence that starts with the seed S. Note that, as an example, if a new pseudo-random sequence is started every day, and a new value every second, the infrastructure node 40 will produce 86,400 values per day. The infrastructure node 40, however, will have to store only S, since the infrastructure node 40 can reconstruct every $S_t$, when needed, by applying RAND a number of times proportional to the number of elapsed seconds since the start of the new day. For example, for an event occurring at 10:45 am, assuming a 1 second time step, RAND would be recursively applied 38,700 times. The RAND computation is typically an operation with relatively low processing overhead. Moreover, scene reconstruction may be an operation that does not need to be performed online (e.g., in real-time).

In another embodiment, in order to speed-up the reconstruction of the pseudo-random value for a given time, RAND may be replaced by a cryptographically secure one-way hash function h (e.g., Secure Hash Algorithm 3/SHA-3) and a counter for every time step. In this case, the value of RAND for time step t may be computed as $S_t=h(S\|t)$ (e.g., for 10:45 am and $\Delta t=1$ sec, $S_{38,700}=h(S\|38,700)$).

The value $S_t$, is used by the infrastructure node 40 to compute the symmetric key $k_t^v$ that is sent to the vehicle 42 alongside $T_t^v$, encrypted with the public key associated with v. In an example embodiment, the infrastructure node 40 computes $k_t^v$ for the v relative to discrete time t using a one way cryptographic hash function h (e.g., SHA-3) as: $k_t^v=h(id_v\|S_t\|info)$.

Figure 4A:
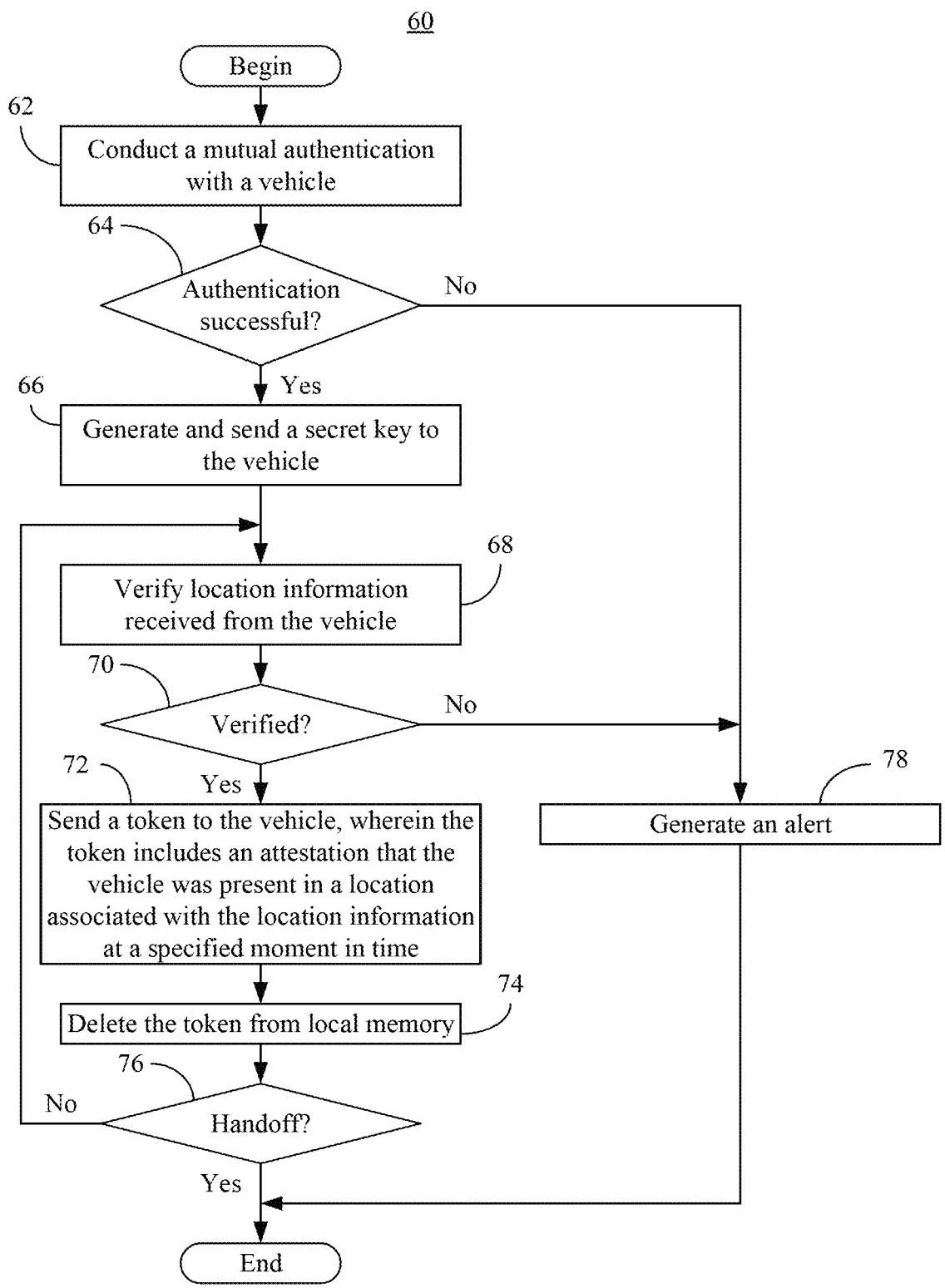
FIG. 4A is a flowchart of an example of a method of operating an infrastructure node according to an embodiment.

FIG. 4A shows a method 60 of operating an infrastructure node. The method 60 may generally be implemented in a computing system such as, for example, the infrastructure node 20 (FIG. 1) and/or the infrastructure node 40 (FIG. 3), already discussed. More particularly, the method 60 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for conducting a mutual authentication with a vehicle. Block 62 may include a challenge-response protocol that leverages the credentials that both the infrastructure node and the vehicle possess, as already discussed. If it is determined at block 64 that the mutual authentication was successful (e.g., the identity of both entities was confirmed/verified), block 66 generates and sends a secret key to the vehicle. In an embodiment, the secret key is derived from a seed value stored in local memory of the infrastructure node. Block 66 may be bypassed depending on the circumstances (e.g., untrusted storage platforms are not supported). Location information (e.g., Global Positioning System/GPS coordinates, latitude-longitude, lane number) received from the vehicle may be verified at block 68. Block 68 may also include verifying other information such as speed, acceleration, orientation, EDR information, and so forth.

In this regard, a vehicle may intentionally or unintentionally make inaccurate or wrong measurements and save them in the EDR or report them to the infrastructure node. Block 68 may therefore serve as an independent verifier or authenticator of the measurements. When the multiple vehicles submit measurement reports, block 68 compares them with a locally generated report and reports from other vehicles. In an embodiment, block 68 applies a tolerance value when validating the measurements/observations and there could be partial or complete fabrication of the measurements. If the measurements from vehicles differ, "majority voting" may be used to validate the conflicting vehicle measurements. In other embodiments, instead of using majority voting, block 68 uses a weighting measure where the compiled reports (e.g., state estimates) are modeled as a Gaussian distribution. Bayes filtering may then be used to determine the maximal posterior density resulting from the combination of the reported observations. Moreover, the weights may be computed using position, field of view, state estimate accuracy, how long the observer was tracking an object, etc. In addition, simple anomaly detection may be conducted to exclude outliers. Each of these consensus-based approaches may prevent a malicious observer from biasing the true observations.

More particularly, the reported speed from a vehicle might be compared against the speed measured at the infrastructure node. Block 68 may use the V2X reference signals to estimate the Doppler frequency shift and calculate the speed of the vehicle based on the operating frequency. If the infrastructure node received relative velocities of the vehicle under verification from other verified vehicle reports, block 68 may calculate the absolute speed.

With regard to location, (GPS coordinate, latitude-longitude), block 68 may measure the relative location of the vehicles with the time stamp using radar, depth sensor, V2X path loss, and/or time of flight data. In an embodiment, the measured distance/location of the vehicle is compared against the reported values for validation. If the relative position of the vehicle is available from other validated vehicle reports, block 68 simply calculates the position based on the relative positions and their true positions.

With regard to "neighbor lists," block 68 might obtain an environment perception based on a lidar and/or camera deployed on the road. From the lidar point cloud or image/video, block 68 detects the vehicles and tags them with the time stamp and identity (if available). In one example, the vehicle registers key attributes such as color, license plate number, make and model. Vehicles may report their environment perception reports in the form of raw video, images, raw point clouds, 2D (two-dimensional) map, object lists, local and remote state information, object tracking and trajectory info along with the time stamps. It may be possible to extend the scene perception in the vehicle to recognize key attributes of nearby vehicles. In such a case, the vehicle reports this information to the infrastructure node during the data exchange process. The infrastructure node receives the neighbor list from a vehicle and validates the received neighbor list using locally generated perception data and/or remote perception data (including attribute data) received from the validated vehicles.

With regard to intention/trajectory, using local environment perception data, block 68 may identify the intention and trajectory of the vehicles in the vicinity. Vehicles may also report intention and trajectory information (e.g., navigation paths) to the infrastructure node. In such a case, block 68 would compare reported intention and trajectory with local observations and validate them. The validated environment perception report from other vehicles may also help to improve the accuracy of the validation.

If it is determined at block 70 that the location information received from the vehicle is valid, illustrated block 72 sends a token to the vehicle, wherein the token includes an attestation that the vehicle was present in a location associated with the location information at a specified moment in time. In an embodiment, the attestation is a time stamp corresponding to the specified moment in time, a vehicle identifier, the location information, and a digital signature. Block 74 provides for deleting the token from local memory (e.g., non-volatile memory/NVM and/or volatile memory). Block 74 may be particularly useful in conjunction with block 66 to reduce the storage requirements of the infrastructure node. For example, the infrastructure node might store only a seed value that may be used to reconstruct every $S_t$, when needed, by applying a pseudo random function a number of times proportional to the number of elapsed seconds since the start of the new day.

Illustrated block 76 determines whether a handoff of the vehicle has been initiated (e.g., to another infrastructure node). Block 76 may also determine whether the vehicle has traveled out of range. In either case, the illustrated method 60 terminates. Otherwise, the method 60 may return to block 68. If it is determined at block 64 that the mutual authentication was unsuccessful, block 78 generates an alert (e.g., indicating that an attacker may be present) and the method 60 terminates. Additionally, if it is determined at block 70 that the location information is invalid, block 78 generates an alert and the method 60 terminates. Repeating the method 60 enables a series of periodic tokens to be sent to the vehicle, wherein each periodic token corresponds to a different moment in time (e.g., spaced by Δt).

Figure 4B:
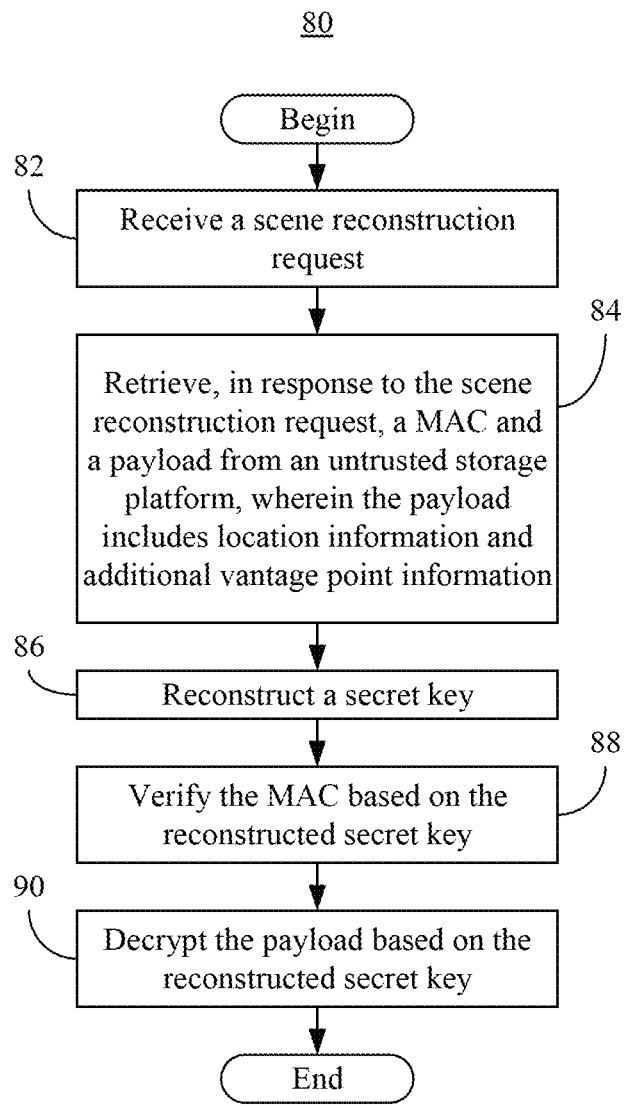
FIG. 4B is a flowchart of an example of a method of responding to a scene reconstruction request according to an embodiment.

FIG. 4B shows a method 80 of responding to a scene reconstruction request. The method 80 may generally be implemented in a computing system such as, for example, the infrastructure node 20 (FIG. 1) and/or the infrastructure node 40 (FIG. 3), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 provides for receiving a scene reconstruction request. The request may be received from a governmental authority, fleet manager, and so forth. In an embodiment, block 84 retrieves, in response to the scene reconstruction request, a message authentication code (MAC) and a payload from an untrusted storage platform, wherein the payload includes location information and additional vantage point information. A secret key may be reconstructed at block 86. As already noted, a pseudo-random generation function, a one-way hash function (e.g., and a counter), etc., may be used to reconstruct the secret key for a specified moment in time. Moreover, a plurality of sub-keys may be derived from the secret key. Block 88 verifies the MAC based on the reconstructed secret key (e.g., using a first sub-key derived from the secret key) and block 90 decrypts the payload based on the reconstructed secret key (e.g., using a second sub-key derived from the secret key).

Figure 5:
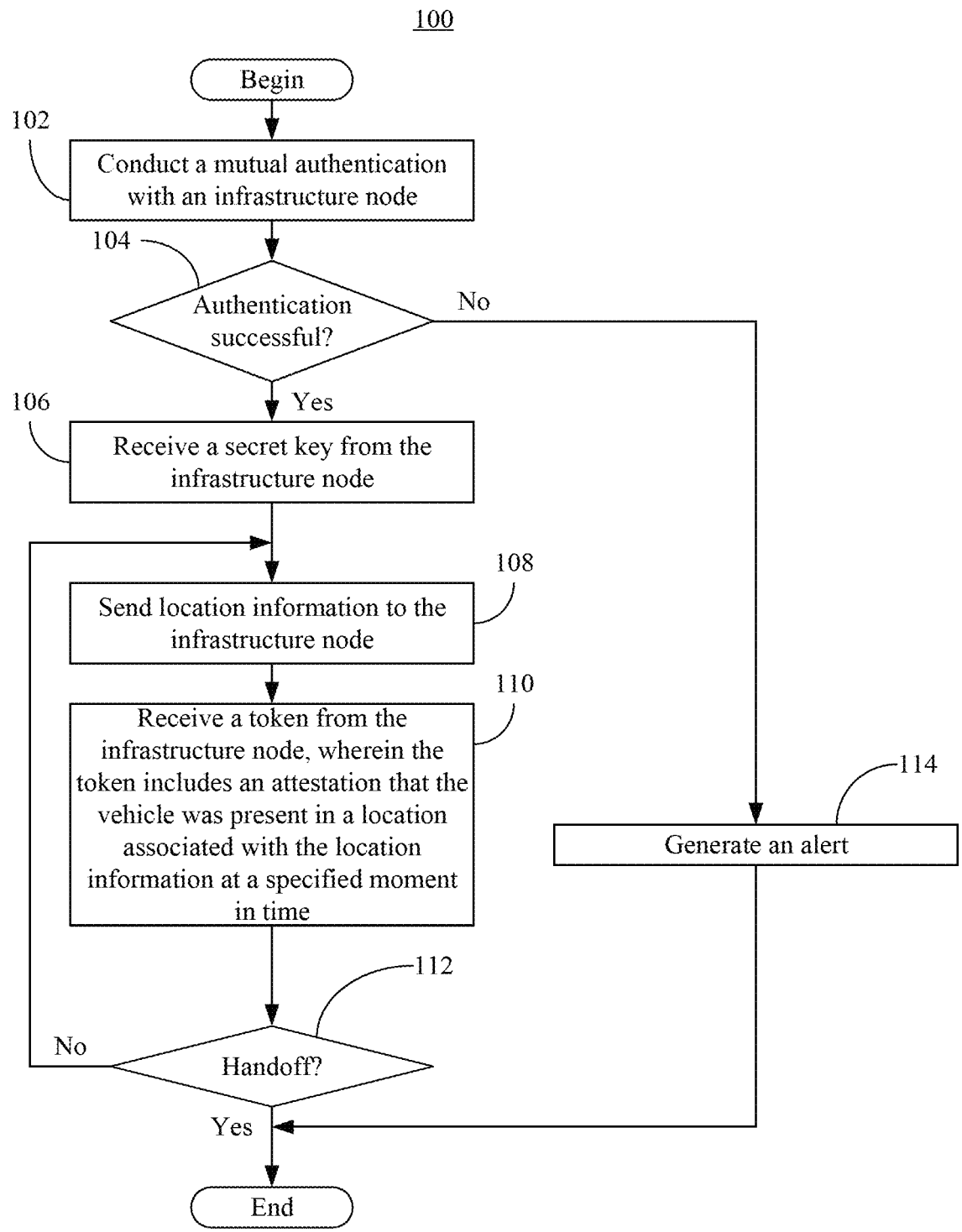
FIG. 5 is a flowchart of an example of a method of operating a vehicle according to an embodiment.

FIG. 5 shows a method 100 of operating a vehicle. The method 100 may generally be implemented in a mobile platform such as, for example, a drone, a robot and/or a vehicle such as the vehicles 12, 14, 16 and/or 22 (FIG. 1) and/or the vehicle 42 (FIG. 3), already discussed. More particularly, the method 100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 102 conducts a mutual authentication with an infrastructure node. Block 102 may include a challenge-response protocol that leverages the credentials that both the infrastructure node and the vehicle possess, as already discussed. If it is determined at block 104 that the mutual authentication was successful (e.g., the identity of both entities was confirmed/verified), block 106 receives a secret key from the infrastructure node. In an embodiment, the secret key is derived from a seed value not known by the vehicle. Block 106 may be bypassed depending on the circumstances (e.g., untrusted storage platforms are not supported). Location information (e.g., GPS coordinates, latitude-longitude, lane number) received from the vehicle may be sent to the infrastructure node for verification at block 108. In an embodiment, block 108 also includes sending additional vantage point information.

Block 110 receives a token from the infrastructure node, wherein the token includes an attestation that the vehicle was present in a location associated with the location information at a specified moment in time. In an embodiment, the attestation is a time stamp corresponding to the specified moment in time, a vehicle identifier, the location information, and a digital signature. Illustrated block 112 determines whether a handoff of the vehicle has been initiated (e.g., to another infrastructure node). Block 112 may also determine whether the vehicle has traveled out of range. In either case, the illustrated method 100 terminates. Otherwise, the method 100 may return to block 108. If it is determined at block 104 that the mutual authentication was unsuccessful, block 114 generates an alert and the method 100 terminates. Repeating the method 100 enables a series of periodic tokens to be sent to the vehicle, wherein each periodic token corresponds to a different moment in time (e.g., spaced by Δt).

Figure 6:
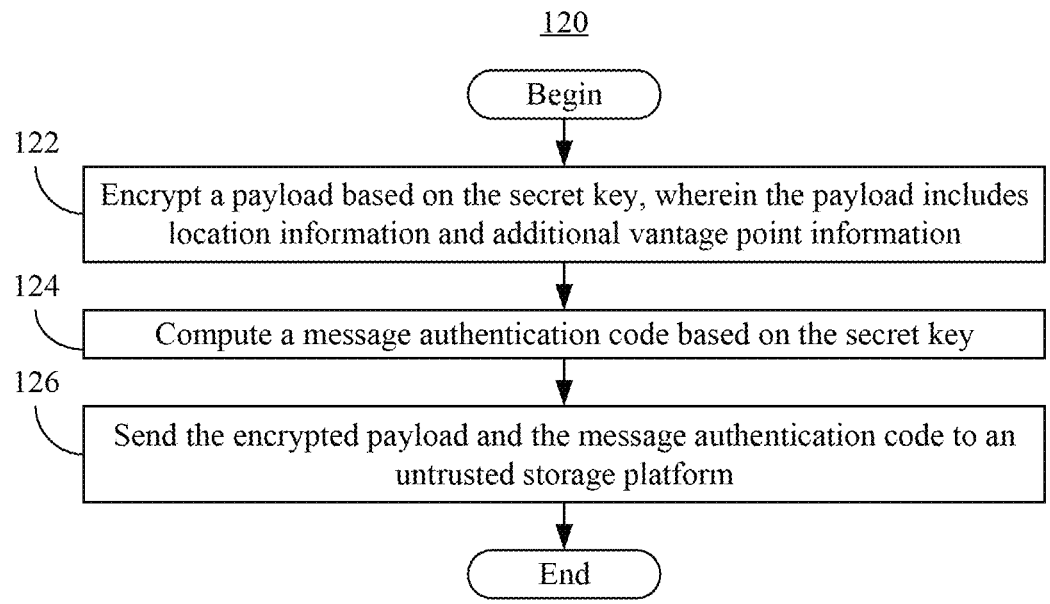
FIG. 6 is a flowchart of an example of a method of transferring location information and additional vantage point information to an untrusted storage platform according to an embodiment.

FIG. 6 shows a method 120 of transferring location information and additional vantage point information to an untrusted storage platform. The method 120 may generally be implemented in a mobile platform such as, for example, a robot, a drone and/or a vehicle such as the vehicles 12, 14, 16 and/or 22 (FIG. 1) and/or the vehicle 42 (FIG. 3), already discussed. More particularly, the method 120 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 122 encrypts a payload based on a secret key, wherein the payload includes location information and additional vantage point information. In an embodiment, the additional vantage point information includes speed information, acceleration information, orientation information, etc., or any combination thereof. In one example, block 122 includes deriving a first sub-key (e.g., k1) from the secret key, wherein the payload is encrypted with the first sub-key. A message authentication code (MAC) is computed at block 124 based on the secret key. In an embodiment, block 124 includes deriving a second sub-key (e.g., k2), wherein the MAC is computed from the second sub-key. Block 126 sends the encrypted payload and the MAC to an untrusted storage platform. The illustrated method 120 therefore facilitates storage savings at the infrastructure node and/or the vehicle, without sacrificing confidentiality or integrity.

Figure 7:
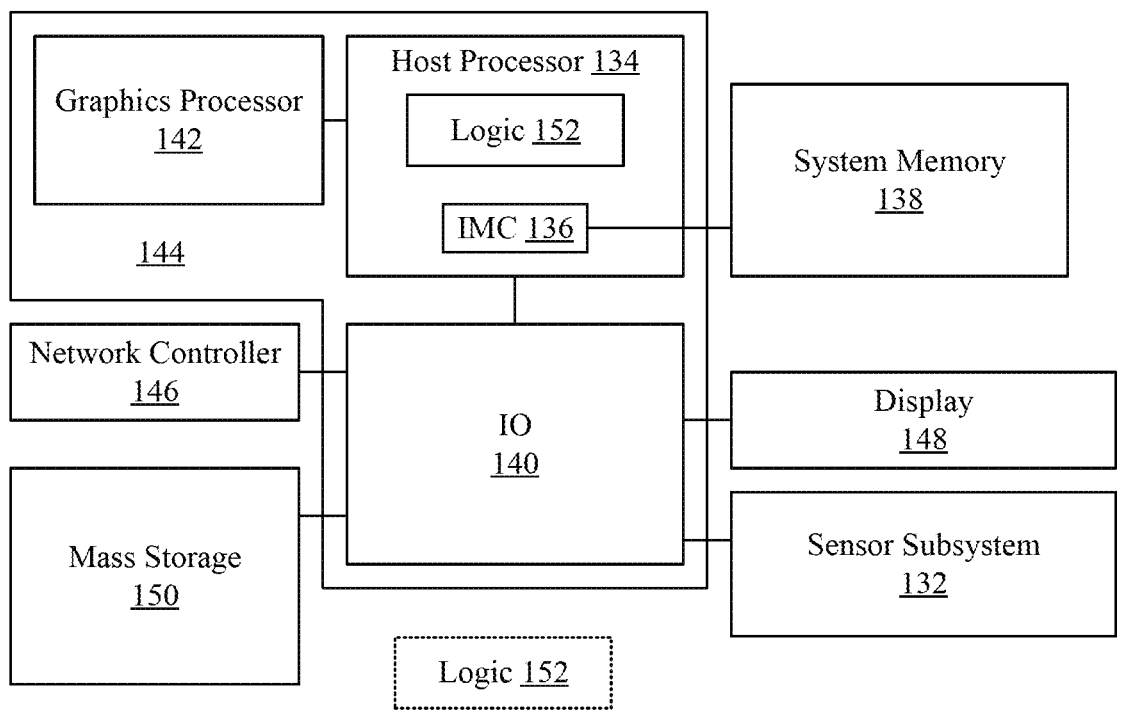
FIG. 7 is a block diagram of an example of an infrastructure node according to an embodiment.

Turning now to FIG. 7, a performance-enhanced infrastructure node 130 is shown. In the illustrated example, the infrastructure node 130 includes a sensor subsystem 132 (e.g., lidar, cameras) and a host processor 134 (e.g., central processing unit/CPU with one or more processor cores) having an integrated memory controller (IMC) 136 that is coupled to a system memory 138. The illustrated infrastructure node 130 also includes an input output (IO) module 140 implemented together with the host processor 134 and a graphics processor 142 on a semiconductor die 144 as a system on chip (SoC). The IO module 140 communicates with, for example, a network controller 146 (e.g., wireless, wired), a display 148, the sensor subsystem 132 and mass storage 150 (e.g., hard disk drive/HDD, optical disk, solid state drive/SSD, flash memory).

The host processor 134 may include logic 152 (e.g., logic instructions, configurable logic, fixed-functionality hardware logic, etc., or any combination thereof) to perform one or more aspects of the method 60 (FIG. 4A), the method 80 (FIG. 4B), and/or the method 120 (FIG. 6), already discussed. Thus, the logic 152 may conduct a mutual authentication with a vehicle and verify, if the mutual authentication is successful, location information received from the vehicle. In an embodiment, the logic 152 also sends a token to the vehicle if the location information is verified, wherein the token includes an attestation that the vehicle was present in a location associated with the location information at a specified moment in time. The infrastructure node 130 may therefore be considered to be performance-enhanced to the extent that the token reduces the likelihood of intentionally or unintentionally false location information being accepted from the vehicle. Performance is also enhanced because the attestation enables the vehicle to prove its location to other third parties (e.g., governmental entities, fleet managers). Although the logic 152 is illustrated in the host processor 134, the logic 152 may reside elsewhere in the infrastructure node 130.

Figure 8:
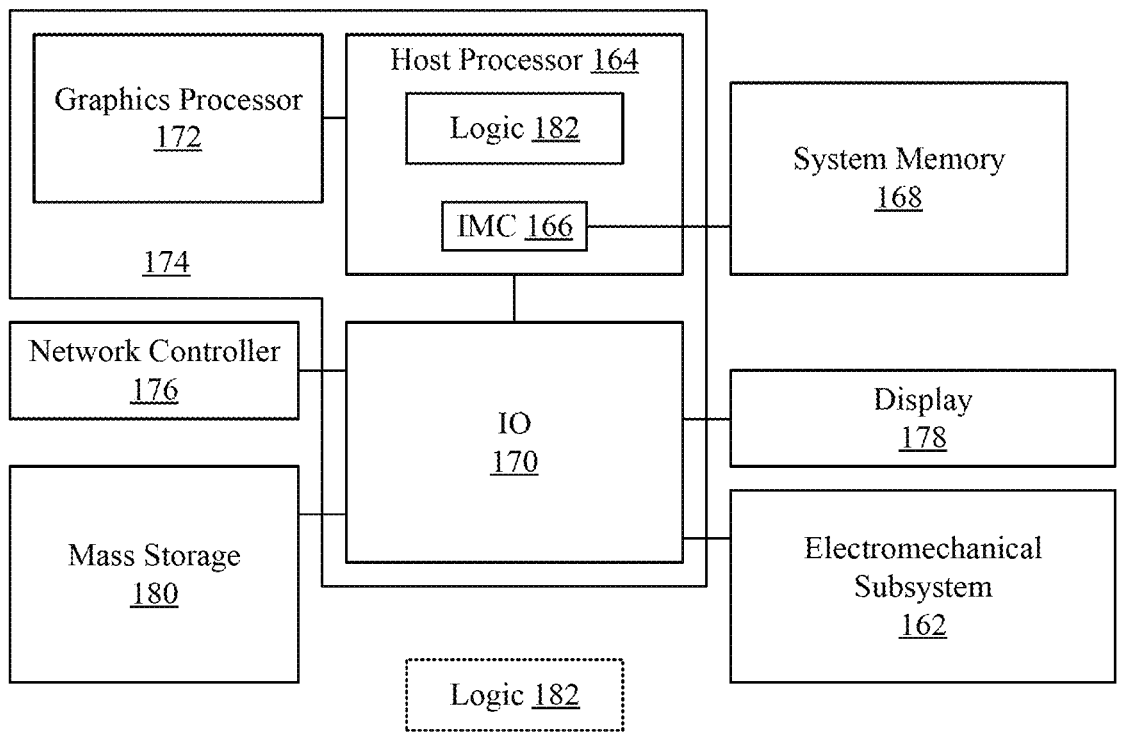
FIG. 8 is a block diagram of an example of a vehicle according to an embodiment.

FIG. 8 shows a performance-enhanced vehicle 160. In the illustrated example, the vehicle 160 includes an electromechanical subsystem 162 (e.g., drive train, steering, navigation, onboard controller, EDR) and a host processor 164 (e.g., CPU with one or more processor cores) having an IMC 166 that is coupled to a system memory 168. In one example, an EDR of the electromechanical subsystem 162 records environmental conditions such as, for example, temperature, wind speed, lighting conditions, precipitation, and so forth. The EDR may also record driving conditions such as, for example, speed, following distance, acceleration, deceleration, breaking state, lane, etc. In an embodiment, the EDR further records social aspects such as, for example, neighbor lists, navigation path (e.g., intention), trajectory, and so forth. Indeed, the EDR may record engine conditions such as, for example, throttle level, loading, revolutions per minute (RPM), etc. The illustrated vehicle 160 also includes an IO module 170 implemented together with the host processor 164 and a graphics processor 172 on a semiconductor die 174 as a system on chip (SoC). The IO module 170 communicates with, for example, a network controller 176 (e.g., wireless, wired), a display 178, the electromechanical subsystem 162 and mass storage 180 (e.g., HDD, optical disk, SSD, flash memory).

The host processor 164 may include logic 182 (e.g., logic instructions, configurable logic, fixed-functionality hardware logic, etc., or any combination thereof) to perform one or more aspects of the method 1000 (FIG. 5), already discussed. Thus, the logic 152 may conduct a mutual authentication with an infrastructure node and send, if the mutual authentication is successful, location information to the infrastructure node. In an embodiment, the logic 182 also receives a token from the infrastructure node, wherein the token includes an attestation that the vehicle was present in a location associated with the location information at a specified moment in time. Additionally, the logic 182 may receive a secret key from the infrastructure node and encrypt a payload based on the secret key, wherein the payload includes the location information and additional vantage point information. In an embodiment, the additional vantage point information includes speed information, acceleration information, orientation information and/or other information captured by the EDR of the electromechanical subsystem 162. The logic 182 may compute a MAC based on the secret key and send the encrypted payload and the MAC to an untrusted storage platform.

The vehicle 160 may therefore be considered to be performance-enhanced to the extent that the token reduces the likelihood of intentionally or unintentionally false location information being accepted from the vehicle 160. Performance is also enhanced because the attestation enables the vehicle 160 to prove its location to other third parties (e.g., governmental entities, fleet managers). Although the logic 182 is illustrated in the host processor 164, the logic 182 may reside elsewhere in the vehicle 160.

Figure 9:
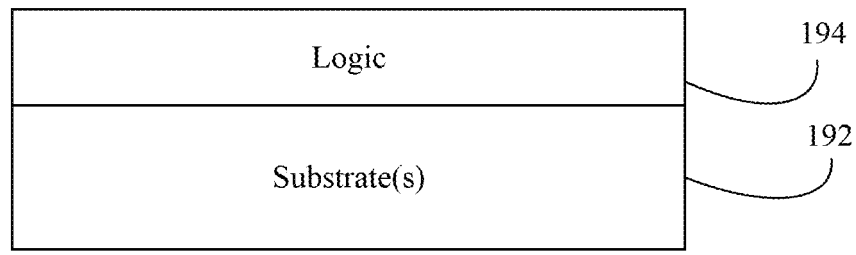
FIG. 9 is an illustration of an example of a semiconductor package apparatus according to an embodiment.

FIG. 9 shows a semiconductor package apparatus 190. The apparatus 190 may include logic 194 to implement one or more aspects of the method 60 (FIG. 4A), the method 80 (FIG. 4B), the method 100 (FIG. 5), and/or the method 120 (FIG. 6), already discussed, and may be readily substituted for the logic 152 (FIG. 7) and/or the logic 182 (FIG. 8), already discussed. The illustrated apparatus 190 includes one or more substrates 192 (e.g., silicon, sapphire, gallium arsenide), wherein the logic 194 (e.g., transistor array and other integrated circuit/IC components) is coupled to the substrate(s) 192. The logic 194 may be implemented at least partly in configurable logic or fixed-functionality logic hardware. In one example, the logic 194 includes transistor channel regions that are positioned (e.g., embedded) within the substrate(s) 192. Thus, the interface between the logic 194 and the substrate(s) 192 may not be an abrupt junction. The logic 194 may also be considered to include an epitaxial layer that is grown on an initial wafer of the substrate(s) 192.

Additional Notes and Examples

Example 1 includes a semiconductor apparatus comprising one or more substrates and logic coupled to the one or more substrates, wherein the logic is implemented at least partly in one or more of configurable logic or fixed-functionality hardware logic, the logic coupled to the one or more substrates to conduct a mutual authentication with a vehicle, verify, if the mutual authentication is successful, location information retrieved from the vehicle, and send a token to the vehicle if the location information is verified, wherein the token includes an attestation that the vehicle was present in a location associated with the location information at a specified moment in time.

Example 2 includes the semiconductor apparatus of Example 1, wherein the attestation is a time stamp corresponding to the specified moment in time, a vehicle identifier, the location information, and a digital signature.

Example 3 includes the semiconductor apparatus of Example 1, wherein the logic coupled to the one or more substrates is to send, if the mutual authentication is successful, a secret key to the vehicle, and delete the token from local memory.

Example 4 includes the semiconductor apparatus of Example 3, wherein the logic is to derive the secret key from a seed value stored in the local memory.

Example 5 includes the semiconductor apparatus of Example 3, wherein the logic is to retrieve, in response to a scene reconstruction request, a message authentication code and a payload from an untrusted storage platform, wherein the payload includes the location information and additional vantage point information, reconstruct the secret key, verify the message authentication code based on the reconstructed secret key, and decrypt the payload based on the reconstructed secret key.

Example 6 includes the semiconductor apparatus of any one of Examples 1 to 5, wherein the logic coupled to the one or more substrates is to send a series of periodic tokens to the vehicle, and wherein each periodic token corresponds to a different moment in time.

Example 7 includes at least one computer readable storage medium comprising a set of instructions, which when executed by a computing system, cause the computing system to conduct a mutual authentication with a vehicle, verify, if the mutual authentication is successful, location information received from the vehicle, and send a token to the vehicle if the location information is verified, wherein the token includes an attestation that the vehicle was present in a location associated with the location information at a specified moment in time.

Example 8 includes the at least one computer readable storage medium of Example 7, wherein the attestation is a time stamp corresponding to the specified moment in time, a vehicle identifier, the location information, and a digital signature.

Example 9 includes the at least one computer readable storage medium of Example 7, wherein the instructions, when executed, further cause the computing system to send, if the mutual authentication is successful, a secret key to the vehicle, and delete the token from local memory.

Example 10 includes the at least one computer readable storage medium of Example 9, wherein the instructions, when executed, further cause the computing system to derive the secret key from a seed value stored in the local memory.

Example 11 includes the at least one computer readable storage medium of Example 9, wherein the instructions, when executed, further cause the computing system to retrieve, in response to a scene reconstruction request, a message authentication code and a payload from an untrusted storage platform, wherein the payload includes the location information and additional vantage point information, reconstruct the secret key, verify the message authentication code based on the reconstructed secret key, and decrypt the payload based on the reconstructed secret key.

Example 12 includes the at least one computer readable storage medium of any one of Examples 7 to 11, wherein the instructions, when executed, cause the computing system to send a series of periodic tokens to the vehicle, and wherein each periodic token corresponds to a different moment in time.

Example 13 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to conduct a mutual authentication with an infrastructure node, send, if the mutual authentication is successful, location information to the infrastructure node, and receive a token from the infrastructure node, wherein the token includes an attestation that the vehicle was present in a location associated with the location information at a specified moment in time.

Example 14 includes the semiconductor apparatus of Example 13, wherein the attestation is a time stamp corresponding to the specified moment in time, a vehicle identifier, the location information, and a digital signature.

Example 15 includes the semiconductor apparatus of Example 13, wherein the logic coupled to the one or more substrates is to receive a secret key from the infrastructure node, encrypt a payload based on the secret key, wherein the payload includes the location information and additional vantage point information, compute a message authentication code based on the secret key, and send the encrypted payload and the message authentication code to an untrusted storage platform.

Example 16 includes the semiconductor apparatus of Example 15, wherein the logic coupled to the one or more substrates is to derive a first sub-key from the secret key, wherein the payload is encrypted with the first sub-key, and derive a second sub-key from the secret key, wherein the message authentication code is computed from the second sub-key.

Example 17 includes the semiconductor apparatus of Example 15, wherein the additional vantage point information includes one or more of speed information, acceleration information or orientation information.

Example 18 includes the semiconductor apparatus of any one of Examples 13 to 17, wherein the logic coupled to the one or more substrates is to receive a series of periodic tokens from the infrastructure node, and wherein each periodic token corresponds to a different moment in time.

Example 19 includes at least one computer readable storage medium comprising a set of instructions, which when executed by a vehicle, cause the vehicle to conduct a mutual authentication with an infrastructure node, send, if the mutual authentication is successful, location information to the infrastructure node, and receive a token from the infrastructure node, wherein the token includes an attestation that the vehicle was present in a location associated with the location information at a specified moment in time.

Example 20 includes the at least one computer readable storage medium of Example 19, wherein the attestation is a time stamp corresponding to the specified moment in time, a vehicle identifier, the location information, and a digital signature.

Example 21 includes the at least one computer readable storage medium of Example 19, wherein the instructions, when executed, further cause the vehicle to receive a secret key from the infrastructure node, encrypt a payload based on the secret key, wherein the payload includes the location information and additional vantage point information, compute a message authentication code based on the secret key, and send the encrypted payload and the message authentication code to an untrusted storage platform.

Example 22 includes the at least one computer readable storage medium of Example 21, wherein the instructions, when executed, further cause the vehicle to derive a first sub-key from the secret key, wherein the payload is encrypted with the first sub-key, and derive a second sub-key from the secret key, wherein the message authentication code is computed from the second sub-key.

Example 23 includes the at least one computer readable storage medium of Example 21, wherein the additional vantage point information includes one or more of speed information, acceleration information or orientation information.

Example 24 includes the at least one computer readable storage medium of any one of Examples 19 to 23, wherein the instructions, when executed, cause the vehicle to receive a series of periodic tokens from the infrastructure node, and wherein each periodic token corresponds to a different moment in time.

Example 25 includes a method of operating a computing system, comprising conducting a mutual authentication with a vehicle, verifying, if the mutual authentication is successful, location information received from the vehicle, and sending a token to the vehicle if the location information is verified, wherein the token includes an attestation that the vehicle was present in a location associated with the location information at a specified moment in time.

Example 26 includes a method of operating a vehicle, comprising conducting a mutual authentication with an infrastructure node, sending, if the mutual authentication is successful, location information to the infrastructure node, and receiving a token from the infrastructure node, wherein the token includes an attestation that the vehicle was present in a location associated with the location information at a specified moment in time.

Example 26 includes means for performing the method of any one of Examples 25 to 26.

Thus, technology described herein enables an infrastructure node (IN) to issue cryptographically secure tokens to vehicles that serve as a proof of their location at a given moment in time. In the case of a traffic event such as an accident, a vehicle that possesses the token associated with that location and time will be able to prove that is indeed a legitimate witness.

From the infrastructure perspective, the technology has the potential to considerably reduce storage requirements. The infrastructure, instead of continuously recording all traffic data, will only store the information needed to validate the tokens. In case of a traffic event, the vehicles will provide the content of their event data recorder (EDR) accompanied by the token previously supplied by the infrastructure. Such an approach has the potential to reduce the storage requirements from an amount that would grow linearly with the number of vehicles passing through the IN's coverage area to a constant amount of data.

From the vehicle perspective, the token may be used in legal disputes. For example, in the case of an accident or a crime, a vehicle that possesses the token related to a different location for the same moment in time would be able to prove it was not involved in accident or crime. Each vehicle may have a unique token for a given location and time, and such token cannot be transferred to other vehicles (as long as the underlying cryptographic signature scheme is secure). In order to speed up the "search for witnesses," the infrastructure may maintain a list of IDs of vehicles that passed over the day, with coarse-grained timing information (e.g., the IN can record the ID of the vehicle, and a list of time intervals in which the vehicle was in the coverage of the IN).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
   conduct a mutual authentication with a vehicle;
   verify, if the mutual authentication is successful, location information received from the vehicle;

send a token to the vehicle if the location information is verified, wherein the token includes an attestation that the vehicle was present in a location associated with the location information at a specified moment in time, wherein the attestation that the vehicle was present in the location is used to prevent an attacker from biasing a scene reconstruction of the location with false sensor data; and receive information captured by one or more sensors associated with one or more additional vehicles, wherein the received information is to be used to perform the scene reconstruction based on successfully attested vehicles.

2. The semiconductor apparatus of claim 1, wherein the attestation is a time stamp corresponding to the specified moment in time, a vehicle identifier, the location information, and a digital signature.

3. The semiconductor apparatus of claim 1, wherein the logic coupled to the one or more substrates is to:
send, if the mutual authentication is successful, a secret key to the vehicle; and
delete the token from local memory.

4. The semiconductor apparatus of claim 3, wherein the logic is to derive the secret key from a seed value stored in the local memory.

5. The semiconductor apparatus of claim 3, wherein the logic is to:
retrieve, in response to a scene reconstruction request, a message authentication code and a payload from an untrusted storage platform, wherein the payload includes the location information and additional vantage point information;
reconstruct the secret key;
verify the message authentication code based on the reconstructed secret key; and
decrypt the payload based on the reconstructed secret key.

6. The semiconductor apparatus of claim 1, wherein the logic coupled to the one or more substrates is to send a series of periodic tokens to the vehicle, and wherein each periodic token corresponds to a different moment in time.

7. At least one non-transitory computer readable storage medium comprising a set of instructions, which when executed by a computing system, cause the computing system to:
conduct a mutual authentication with a vehicle;
verify, if the mutual authentication is successful, location information received from the vehicle;
send a token to the vehicle if the location information is verified, wherein the token includes an attestation that the vehicle was present in a location associated with the location information at a specified moment in time, wherein the attestation that the vehicle was present in the location is used to prevent an attacker from biasing a scene reconstruction of the location with false sensor data; and
receive information captured by one or more sensors associated with one or more additional vehicles, wherein the received information is to be used to perform the scene reconstruction based on successfully attested vehicles.

8. The at least one computer readable storage medium of claim 7, wherein the attestation is a time stamp corresponding to the specified moment in time, a vehicle identifier, the location information, and a digital signature.

9. The at least one computer readable storage medium of claim 7, wherein the instructions, when executed, further cause the computing system to:
send, if the mutual authentication is successful, a secret key to the vehicle; and
delete the token from local memory.

10. The at least one computer readable storage medium of claim 9, wherein the instructions, when executed, further cause the computing system to derive the secret key from a seed value stored in the local memory.

11. The at least one computer readable storage medium of claim 9, wherein the instructions, when executed, further cause the computing system to:
retrieve, in response to a scene reconstruction request, a message authentication code and a payload from an untrusted storage platform, wherein the payload includes the location information and additional vantage point information;
reconstruct the secret key;
verify the message authentication code based on the reconstructed secret key; and
decrypt the payload based on the reconstructed secret key.

12. The at least one computer readable storage medium of claim 7, wherein the instructions, when executed, cause the computing system to send a series of periodic tokens to the vehicle, and wherein each periodic token corresponds to a different moment in time.

13. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
conduct a mutual authentication with an infrastructure node;
send, if the mutual authentication is successful, location information associated with a vehicle to the infrastructure node;
receive a token from the infrastructure node, wherein the token includes an attestation that the vehicle was present in a location associated with the location information at a specified moment in time, wherein the attestation that the vehicle was present in the location is used to prevent an attacker from biasing a scene reconstruction of the location with false sensor data; and
send information captured by one or more sensors of the vehicle, wherein the information is to be used to perform the scene reconstruction based on successfully attested vehicles.

14. The semiconductor apparatus of claim 13, wherein the attestation is a time stamp corresponding to the specified moment in time, a vehicle identifier, the location information, and a digital signature.

15. The semiconductor apparatus of claim 13, wherein the logic coupled to the one or more substrates is to:
receive a secret key from the infrastructure node;
encrypt a payload based on the secret key, wherein the payload includes the location information and additional vantage point information;
compute a message authentication code based on the secret key; and
send the encrypted payload and the message authentication code to an untrusted storage platform.

16. The semiconductor apparatus of claim 15, wherein the logic coupled to the one or more substrates is to:
derive a first sub-key from the secret key, wherein the payload is encrypted with the first sub-key; and derive a second sub-key from the secret key, wherein the message authentication code is computed from the second sub-key.

17. The semiconductor apparatus of claim 15, wherein the additional vantage point information includes one or more of speed information, acceleration information or orientation information.

18. The semiconductor apparatus of claim 13, wherein the logic coupled to the one or more substrates is to receive a series of periodic tokens from the infrastructure node, and wherein each periodic token corresponds to a different moment in time.

19. At least one non-transitory computer readable storage medium comprising a set of instructions, which when executed by a system of a vehicle, cause the vehicle to:
conduct a mutual authentication with an infrastructure node;
send, if the mutual authentication is successful, location information associated with a vehicle to the infrastructure node;
receive a token from the infrastructure node, wherein the token includes an attestation that the vehicle was present in a location associated with the location information at a specified moment in time, wherein the attestation that the vehicle was present in the location is used to prevent an attacker from biasing a scene reconstruction of the location with false sensor data; and
send information captured by one or more sensors of the vehicle, wherein the information is to be used to perform the scene reconstruction based on successfully attested vehicles.

20. The at least non-transitory one computer readable storage medium of claim 19, wherein the attestation is a time stamp corresponding to the specified moment in time, a vehicle identifier, the location information, and a digital signature.

21. The at least one non-transitory computer readable storage medium of claim 19, wherein the instructions, when executed, further cause the vehicle to:
receive a secret key from the infrastructure node;
encrypt a payload based on the secret key, wherein the payload includes the location information and additional vantage point information;
compute a message authentication code based on the secret key; and
send the encrypted payload and the message authentication code to an untrusted storage platform.

22. The at least one non-transitory computer readable storage medium of claim 21, wherein the instructions, when executed, further cause the vehicle to:
derive a first sub-key from the secret key, wherein the payload is encrypted with the first sub-key; and
derive a second sub-key from the secret key, wherein the message authentication code is computed from the second sub-key.

23. The at least one non-transitory computer readable storage medium of claim 21, wherein the additional vantage point information includes one or more of speed information, acceleration information or orientation information.

24. The at least one non-transitory computer readable storage medium of claim 19, wherein the instructions, when executed, cause the vehicle to receive a series of periodic tokens from the infrastructure node, and wherein each periodic token corresponds to a different moment in time.

\* \* \* \* \*

UNITED STATES PATENT AND TRADEMARK OFFICE
CERTIFICATE OF CORRECTION

PATENT NO. : 12,081,680 B2
APPLICATION NO. : 17/492830
DATED : September 3, 2024
INVENTOR(S) : Ambrosin et al.

Page 1 of 1

It is certified that error appears in the above-identified patent and that said Letters Patent is hereby corrected as shown below:

In the Claims

In Column 15, Line 61, in Claim 8, before "computer readable", insert --non-transitory--

In Column 15, Line 65, in Claim 9, before "computer readable", insert --non-transitory--

In Column 16, Line 4, in Claim 10, before "computer readable", insert --non-transitory--

In Column 16, Line 8, in Claim 11, before "computer readable", insert --non-transitory--

In Column 16, Line 21, in Claim 12, before "computer readable", insert --non-transitory--

In Column 17, Line 33, in Claim 20, delete "non-transitory one" and insert --one non-transitory-- therefor Signed and Sealed this
Ninth Day of September, 2025

Coke Morgan Stewart
*Acting Director of the United States Patent and Trademark Office*